United States Patent [19]
DeLaby et al.

[11] Patent Number: 5,607,079
[45] Date of Patent: Mar. 4, 1997

[54] COLLAPSIBLE DROP SPREADER

[75] Inventors: Aaron D. DeLaby, Carlsbad; Paul M. Havlovitz, Escondido, both of Calif.

[73] Assignee: Republic Tool & Mfg. Corp., Carlsbad, Calif.

[21] Appl. No.: 504,473

[22] Filed: Jul. 20, 1995

[51] Int. Cl.⁶ .................................................. B67D 5/22
[52] U.S. Cl. ........................... 222/45; 222/625; 222/235; 239/685
[58] Field of Search .................................. 222/41, 45, 609, 222/611.1, 613, 614, 619, 623, 624, 625, 235, 473, 474; 239/669, 685, 687

[56] References Cited

U.S. PATENT DOCUMENTS

| 1,985,191 | 12/1934 | Nottingham | 222/611.1 |
| 3,122,273 | 2/1964 | Atkinson | 222/41 |
| 3,310,314 | 3/1967 | Blymsm et al. | 271/15 |
| 3,773,229 | 11/1973 | Gandrud | 222/609 |
| 4,121,733 | 10/1978 | McRoskey | 222/43 |
| 4,180,184 | 12/1979 | Florer et al. | 222/473 X |
| 4,635,818 | 1/1987 | Glass | 222/41 |
| 4,671,434 | 6/1987 | Johnston et al. | 222/625 |

FOREIGN PATENT DOCUMENTS

| 3610019 | 10/1987 | Germany | 239/685 |
| 2175482 | 12/1986 | United Kingdom | 239/685 |

*Primary Examiner*—Joseph Kaufman
*Attorney, Agent, or Firm*—Harry Williams

[57] ABSTRACT

A drop spreader having a hopper with a series of materials-dispensing apertures therein supported by a pair of wheels, an upper U-shaped frame pivotally connected to a pair of spaced-apart leg members supported on the hopper for use as a handle for the spreader, the hopper further having molded in place a pair of sleeve members adjacent the rim thereof for receiving the respective leg members, a shutoff bar adjacent the apertures being composed of two different materials, plastic enveloping metal, and further the use of a simple pivotal snap connection between the micrometer device used with the spreader and the control lever for controlling the movement of the shutoff bar.

11 Claims, 6 Drawing Sheets

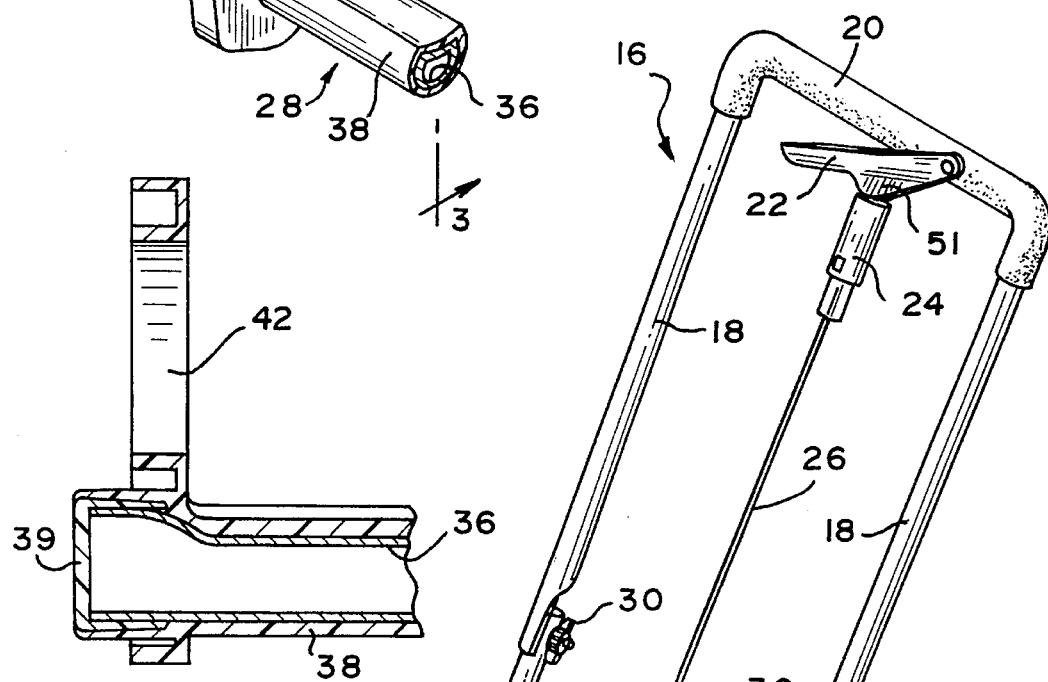
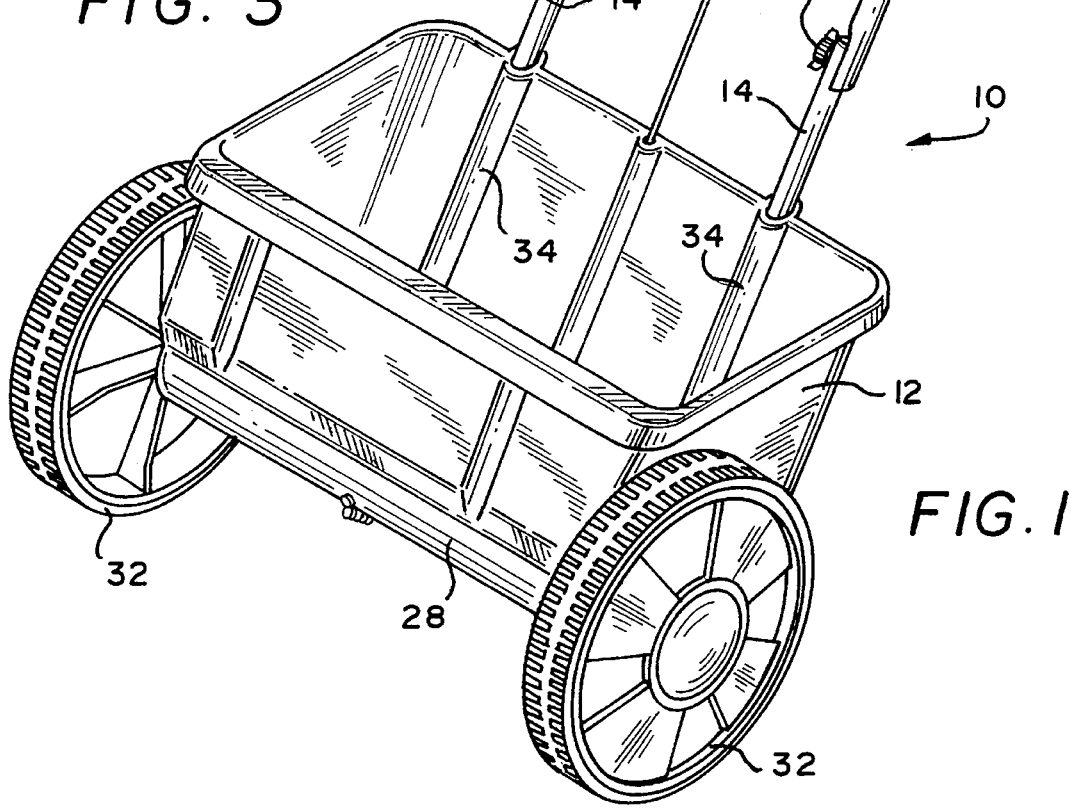

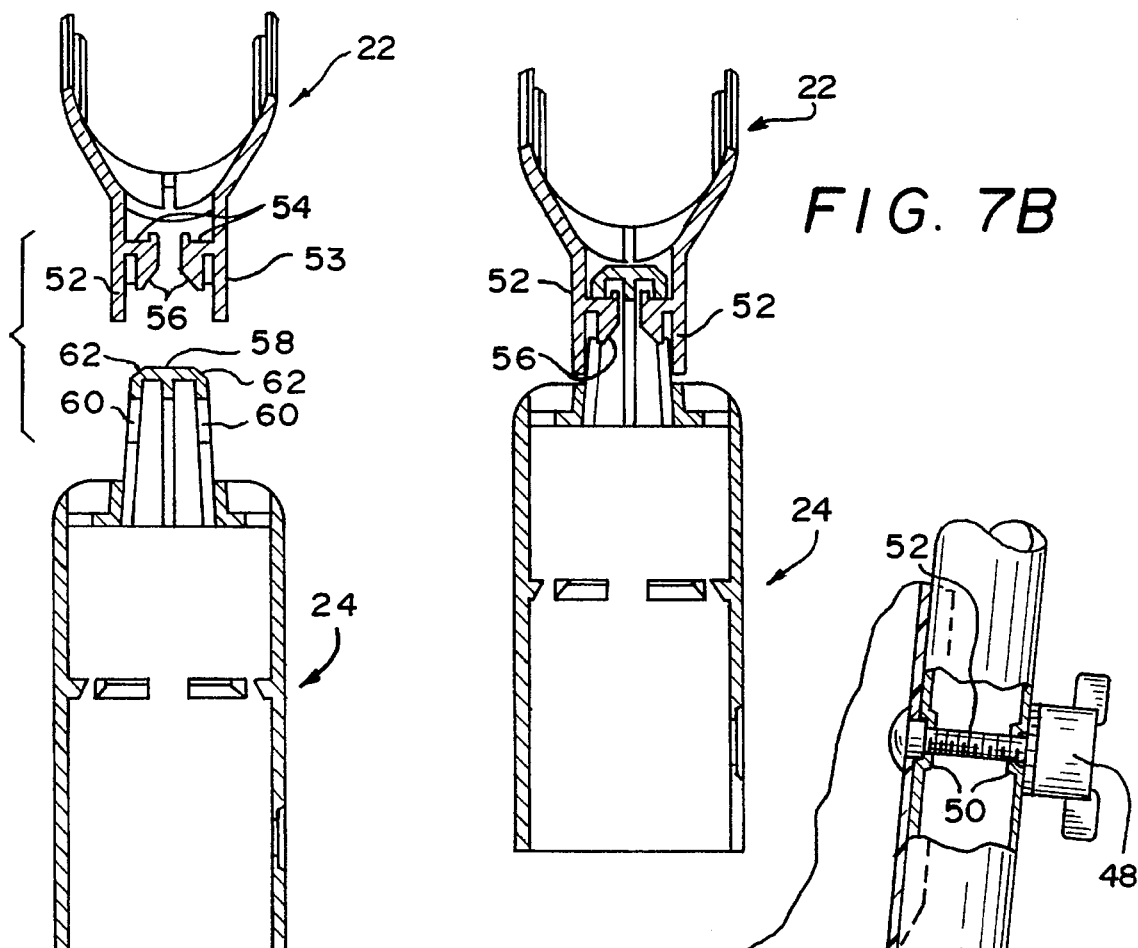
FIG. 7A
FIG. 7B
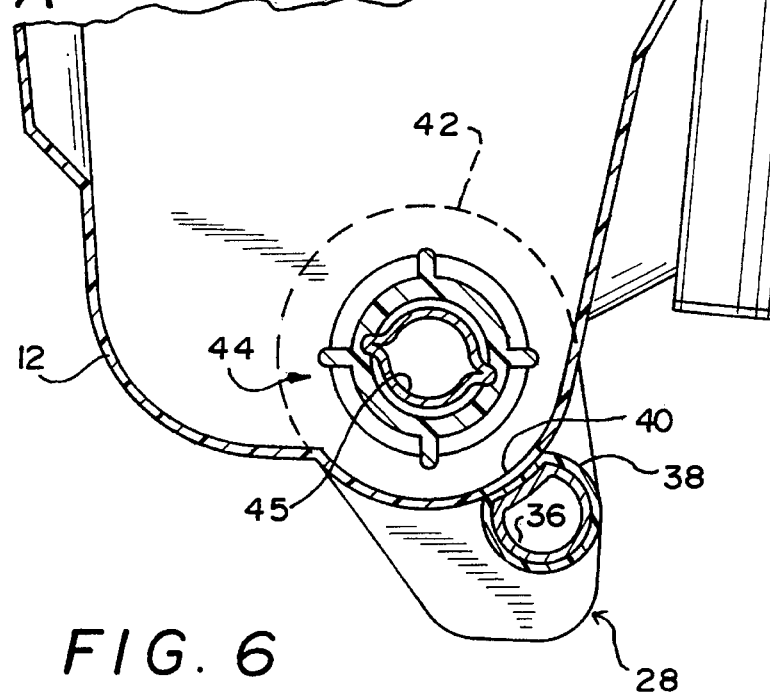
FIG. 6

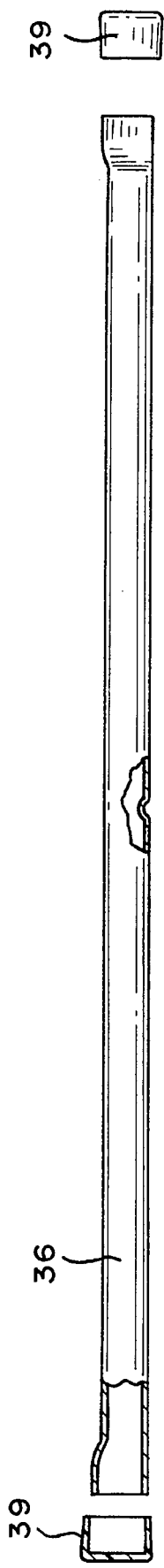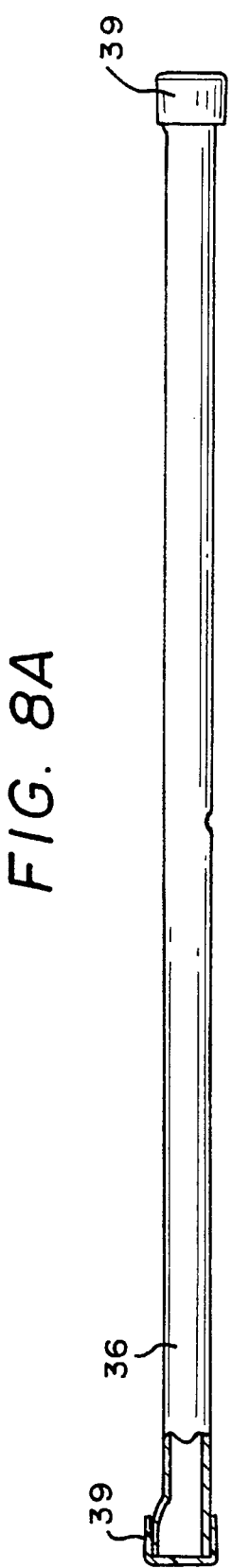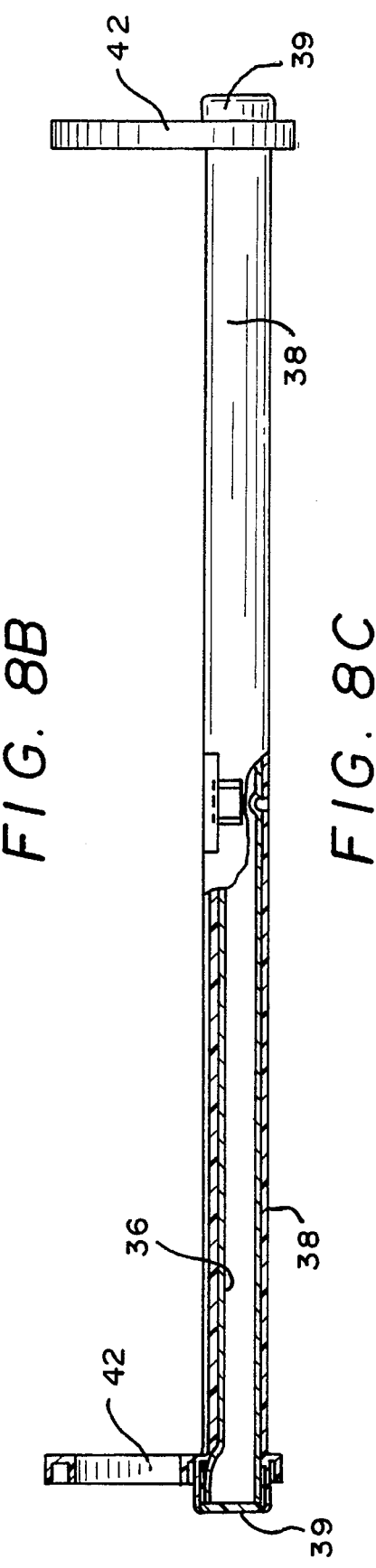

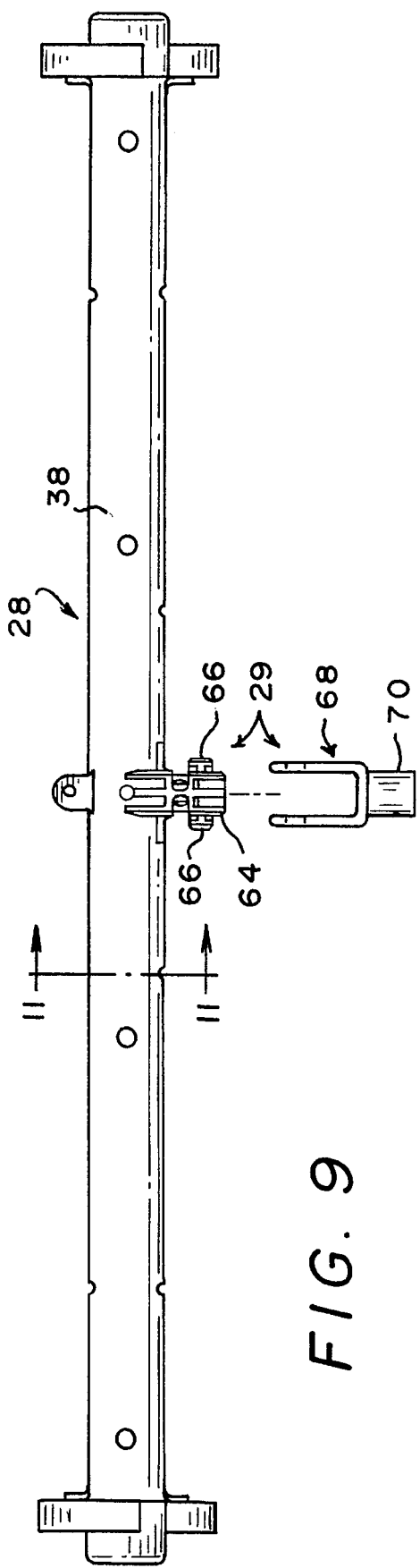
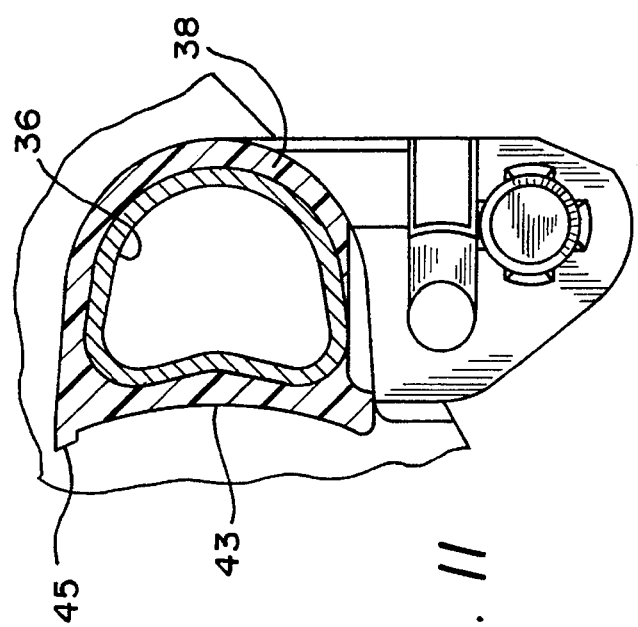
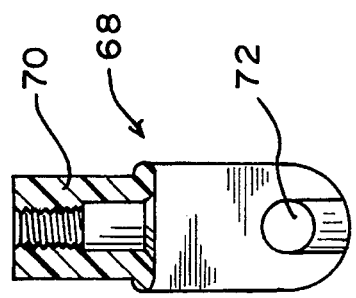
FIG. 9
FIG. 10
FIG. 11

COLLAPSIBLE DROP SPREADER

BACKGROUND OF THE INVENTION

The present invention relates to manually propelled portable drop spreaders supportable on a pair of wheels.

A somewhat related spreader is disclosed in the copending application, entitled Collapsible Drop Spreader, Ser. No. 08/372,579, filed Dec. Jan. 13, 1995 and assigned to the same assignee as the present application. At present there is a need for an improvement in the construction of such spreaders, particularly the construction and operation of the shutoff bar for the hopper, as well as a need for an improvement in the assembly and operation of such spreaders.

OBJECTS AND SUMMARY OF THE INVENTION

It is the principle object and primary purpose of the present invention to address the aforementioned needs and thus provide a collapsible drop spreader which is simple and reliable to use.

For example, one of the features of the present invention is to provide a new and improved shutoff bar for the hopper that uses two different materials for providing both strength and rigidity and at the same time resists corrosion.

Another feature of the present invention is to provide a shutoff bar for the hopper that operates with a cleaning and wiping action with respect to the hopper.

Yet another feature of the present invention is to provide a an efficient molding method for making the shutoff bar above described.

Still another feature of the present invention is to provide an improved connection between the hopper and the leg frame member that forms part of the collapsible handle and which uses a minimum of hardware.

Another feature of the present invention is to provide a simple pivotal snap connection between the micrometer device used with the spreader and the control lever, which construction eliminates the need for hardware.

Still another feature of the present invention is to provide a simple pivotal snap connection between the shutoff bar and the flexible cable operated by the control lever.

And yet another feature of the present invention is to include the aforementioned features in a portable drop spreader that is easily assembled into either a collapsed state for storage or an extended state for use and that requires no tools for assembly or disassembly.

According to one embodiment of the invention there is provided a collapsible drop spreader having a hopper supported by a pair of wheels, an upper U-shaped frame forming a handle and pivotally connected to a pair of spaced-apart lower leg members, the hopper further having molded in place a pair of sleeve members adjacent the rim thereof for receiving the respective leg members, a shutoff bar comprising two different materials, plastic enveloping metal, and further the use of a simple pivotal snap connection between the micrometer device used with the spreader and the control lever for controlling the movement of the shutoff bar, as well as an additional snap-on connection between the shutoff bar and the flexible cable used to operate the shutoff bar.

The invention will be better understood as well as further features, objects and advantages thereof become more apparent from the ensuing detailed description taken in conjunction with the drawings.

BRIEF DESCRIPTION OF THE DRAWINGS

FIG. 1 is a schematic perspective view of the portable wheeled drop spreader according to the invention;

FIG. 2 is a schematic detail of one end of the shutoff bar, according to the invention;

FIG. 3 is a schematic cross-sectional a view of one end of the shutoff bar taken along the lines 3—3 in FIG. 2;

FIG. 6 is an enlarged schematic cross-sectional detail of one of the lower leg members attached to the back of the hopper, taken along lines 6—6 in FIG. 4;

FIGS. 7A and 7B are schematic cross sectional views of the assembly of the micrometer device and part of the control lever in FIG. 4;

FIGS. 8A–8C are schematic cross sectional views showing the method of assembly of the construction of the shutoff bar, according to the invention;

FIG. 9 is a schematic plan view of the shutoff bar according to the invention showing the snap-on connection;

FIG. 10 is a schematic cross-section detail of the snap-on connector associated with the flexible cable;

FIG. 11 is an enlarged schematic cross-section of the shutoff bar showing the curved operating face thereof taken along the lines 11—11 in FIG. 9;

DETAILED DESCRIPTION OF THE PREFERRED EMBODIMENTS

Figures 4, 5:
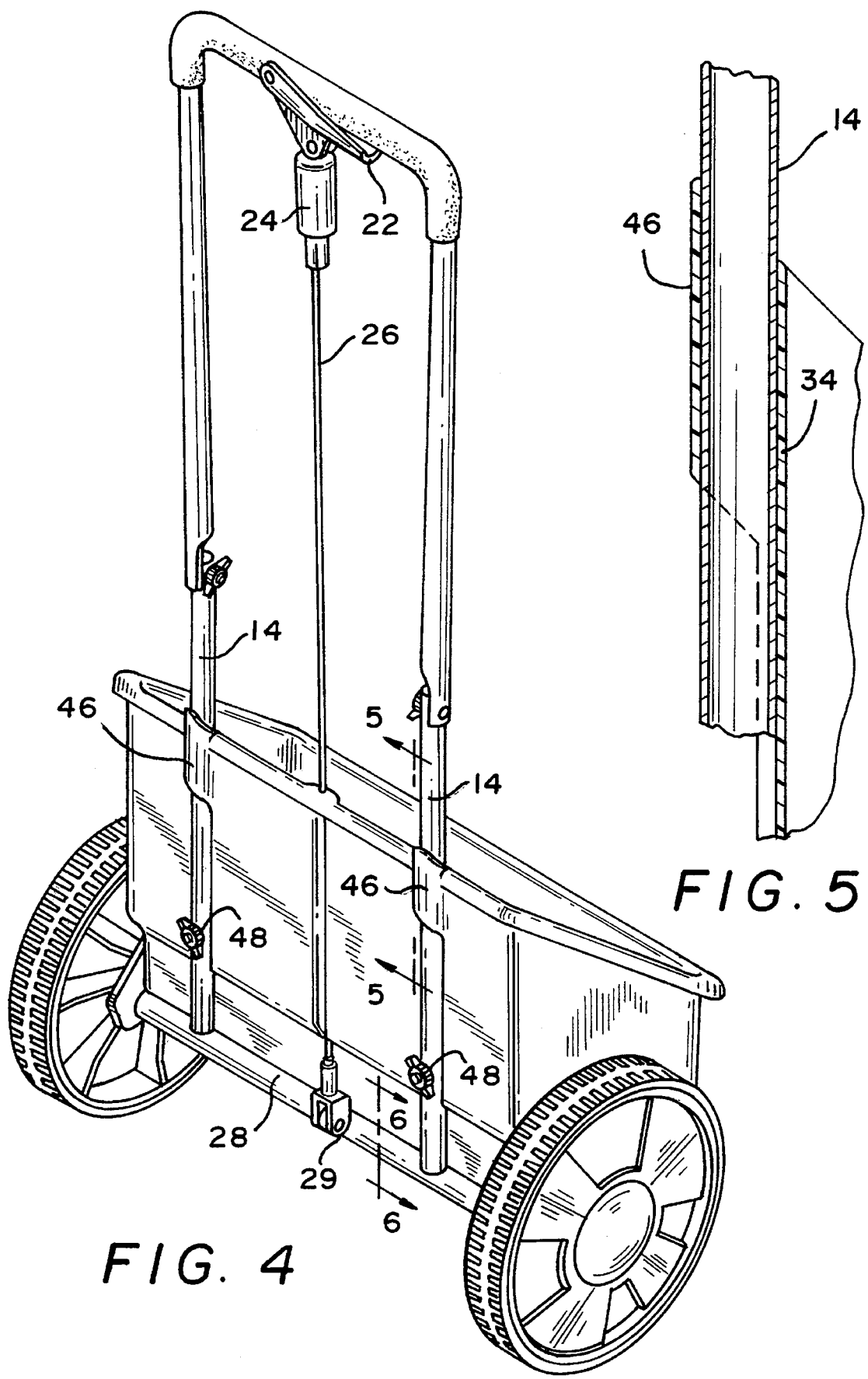
FIG. 4 is a schematic perspective view of the rear of the portable drop spreader, showing the attachment of the lower legs to the hopper, according to the invention.
FIG. 5 is a schematic detail of one of the lower leg members fitted into the back of the hopper taken along 5—5 in FIG.

Referring now to FIG. 1 there is shown a drop spreader 10 having a hopper 12 of molded plastic material, a pair of hollow metal tubular leg members 14 secured by suitable fasteners (see below) to the rear of the hopper (see FIG. 4), a metal upper frame 16 having hollow metal tubular leg members 18 and a handle portion 20. The tubular leg members 14, 18 are preferably parallel but need not be limited to that arrangement and can, if so desired, be angled with respect to one another. Also shown is a control lever 22 pivotally connected to the handle and cooperative with a micrometer adjustment device 24 to be explained below. The lever 22 controls the flexible cable 26 which is connected to a connector member 29 (see FIG. 9) for operating the shutoff bar 28 in the conventional manner, although the manner in which the shutoff bar is connected to the flexible cable and the composition of the shutoff bar are both germane to the present invention and will be more fully explained below. Fasteners 30 are shown securing the pivotal connection between the lower leg members 14 and the upper leg members 18 respectively which are shown in their extended state. Fasteners 30 are similar in design to those described in the U.S. Pat. No. to McRoskey, 5,064,325, having the same assignee as the present invention, the disclosure of which is incorporated herein by reference. Further shown are wheels 32 provided in the manner disclosed more fully in the aforementioned copending application, the disclosure of which is incorporated herein by reference. Because of the pivotal connection between the upper frame 16 and the leg members 14 attached to the hopper, the spreader 10 can be pivoted to its collapsed state so that the spreader can then be stored in a confined space, such as a closet, the back of a truck or the trunk of a car.

With further reference to FIG. 1 there is also shown on the back of the hopper 12 recessed portions or valleys 34 for respectively receiving the lower leg members, to be more fully discussed below.

FIGS. 2 and 3 show one end of the shutoff bar 28 constructed in accordance with the invention, namely high-strength metal insert or core member 36, steel, for example, preferably hollow but could be solid and encased by an outer sheath of light-weight plastic material 38, which is in moving engagement with the materials-dispensing aperture 40 extending the length of the bottom of the hopper 12, also composed of plastic material, as best seen in FIG. 6. Preferably, the dispensing aperture 40 is an in-line series of holes but alternatively may be a single continuous aperture extending parallel to the wheel axle of the hopper. Also located at the bottom of the hopper 12 in the interior thereof and disposed adjacent the opening 40 in FIG. 6 in a known manner is an agitator bar 44, surrounding the wheel axle 45, which structure forms no part of the present invention but is fully disclosed in the aforementioned pending application. The shutoff bar 28 is seen to have a journal support member 42 at each end thereof, only one of which is shown and which forms part of the plastic sheath encasing the metal core or insert member 36. The journal member 42 surrounds the bearing that supports the axle for the wheels, which is disclosed more fully in the aforementioned copending application. Also shown in FIG. 3 is a plastic end cap 39 mounted on the respective ends of the metal insert 36. As shown in FIGS. 2, 6 and 11, the shutoff bar has a curved surface 43 (see FIG. 11) which complements the curved surface to the hopper (see FIG. 6) in the vicinity of the dispensing aperture 40. These complementary surfaces in addition to making for a snug sliding fit allow for a wiping action therebetween so that should any residue from the fertilizer collect around the dispensing aperture 40 it is wiped free by the sliding action of the shutoff bar past the dispensing aperture. In this way, too, a corrosion-free relationship is maintained between the moving parts. To enhance the aforementioned wiping action and also to absorb any post-manufacturing tolerances that might contribute to a less than snug sliding fit between the parts, one end of the curved surface 43 of the plastic sheath 38 is provided with a longitudinally extended rib 45, as best shown in FIG. 11. The rib 45 in effects acts as a wiper blade across the curved bottom of the hopper.

Referring now to FIGS. 8A–8C the detailed steps of constructing the shutoff bar 28 for the drop spreader are shown. For example, the first step (FIGS. 8A and 8B) shows the metal insert 36 having plastic end caps 39 placed on the respective ends thereof, after which the assembly is placed into an open injection mold and held in place with stationary pins and magnets. The mold is then closed and the plastic sheath 38 together with the journal support members 42 are then molded around the metal insert member 36, as shown in FIG. 8C. In this way a shutoff bar for use with a drop spreader, as shown, is constructed so as to provide a relatively light weight bar having high strength in order to withstand repeated movement back and forth past the dispensing aperture 40 in the hopper 12, wherein only plastic parts are rubbing against one another, thus taking advantage of their inherent lubricity and non-corrosive properties. As briefly mentioned earlier, a solid bar may be used instead of a hollow tube as the metal insert in the molding step above described, in which case the end caps can be dispensed with.

FIGS. 4 and 5 in conjunction with FIG. 1 show the specific structure for mounting the lower leg members 14 to the rear of the hopper 12. In order to facilitate proper alignment of the legs 14 with the rear of the hopper 12 a pair of spaced-apart recesses 34 are provided (see FIG. 1) which at the top most ends are defined by sleeve portions 46 through which the leg members 14 extend, as shown. Near the bottom ends of the leg members 14 fasteners 48 are provided for securing the leg members to the back of the hopper, as best shown in FIG. 6. For this purpose each of the leg members is provided with aligned through holes 50 through which the threaded shaft 52 of the bolt attached to the rear face of the hopper extends, as shown. The fasteners 48 are of the same design as the other fasteners on the spreader assembly. With the just-described arrangement it will be seen that the leg members 14 can be easily attached to or removed from the hopper 12, but more importantly the leg members when attached require only two fasteners, one on each leg, whereas the holding strength is provided by the tubular sleeve portions 46 on the rim of the hopper through which the leg members extend.

FIGS. 7A and 7B show the quick snap connection between the control lever 22 and the micrometer device which is attached to the control cable 26 (see FIG. 1), the operation of which forms no part of the present invention. The control lever is seen to have a flange-like extension 51 (see FIG. 1) which is made up of two parallel and rigid yet pliable ear members 53. On the interior of each section and facing each other are pivot protrusion nodule members 54 having downwardly facing beveled surfaces 56, as shown. The beveled surfaces are shown spaced above a post extension 58 of the micrometer device 24, the outer housing of which is shown in FIG. 7A. The post member 58 is seen to have a hole 60 disposed on either side of the post and in diametric relationship with one another. In order to connect the micrometer device to the control lever, all that is necessary is to insert the post member 58 between the pliable ear members 53 and push until the beveled surfaces 56 on the pivot protrusion nodule members 54 snap past the beveled corners 62 at the top of the post and engage the respective holes or apertures 60, as shown in FIG. 7B. In this way the control lever 22 and the micrometer device 24 can be connected without the need for hardware, such as a nut and bolt pivot pin or a rivet type of pivot pin. Once connected the micrometer device is free to rotate about the axis of the pivot protrusion nodule members 54; for example, when the control lever is either pulled or released to thereby shift the axial location of the micrometer device together with the control cable 26 connected thereto in order to operate the shutoff bar 28, as is well known and as shown in FIGS. 1 and 4.

FIGS. 9 and 10 show the details of the connector 29 shown in FIG. 4. Molded with the plastic sheath 38 is stud member 64 having a pair of oppositely extending protrusions or pins 66 axially parallel to the axis of the shutoff bar 28. A U-shaped plastic connector member 68 having a stem 70 (see FIG. 10) which is threadedly connected in a conventional manner to one end of the flexible cable 26 has a pair of oppositely facing apertures 72 whose diameter is only slightly larger than the diameter of the pins 66. Because of the plastic material from which the connector 68 is constructed, the ears thereof can be spread apart so that the apertures 72 are made to snap onto the respective pins 66 of the stud member 64 for a secure rotary connection. The connector 29 may be disassembled in the same manner, that is, by spreading the ears of the connector member 68 apart and thus removing the apertures 72 from the pins 66.

Figure 13:
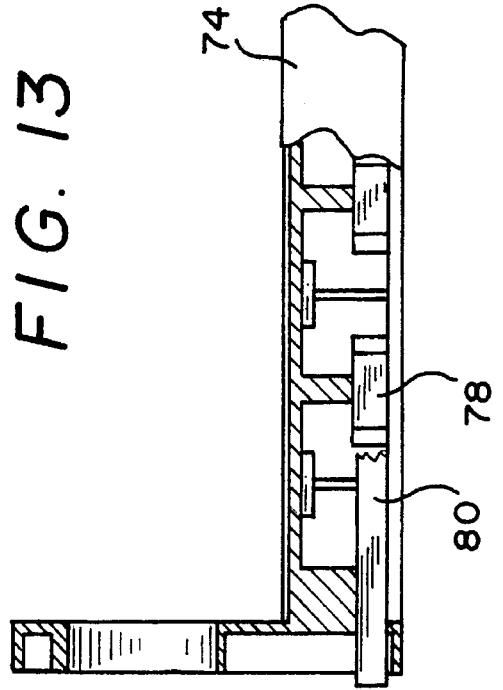
FIG. 13 is schematic cross-sectional view of the shutoff bar shown in FIG. 12.
Figure 12:
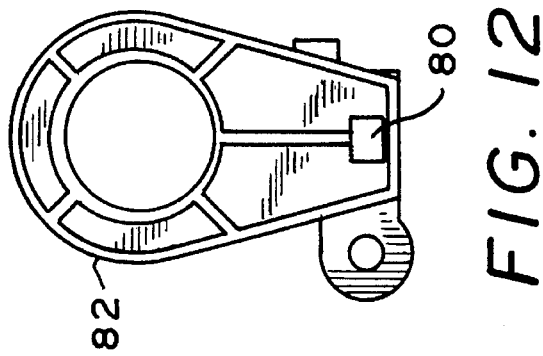
FIG. 12 is a schematic side elevational view, partly in cross-section, of another embodiment of the shutoff bar according to the invention.
Figure 14:
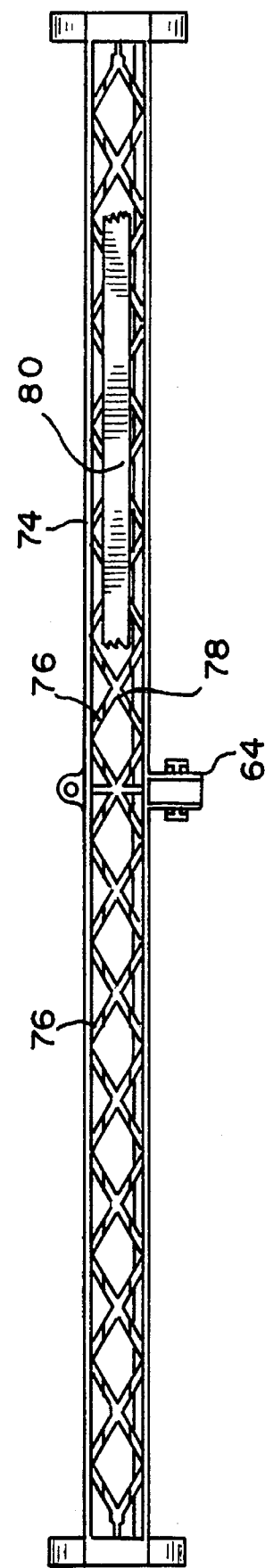
FIG. 14 is a schematic plan view of the shutoff bar according to FIGS. 12 and 13, showing the ribbed construction.

FIGS. 12–14 show another embodiment of the shutoff bar, according to the invention. In this embodiment of the invention the shutoff bar is defined by a substantially hollow plastic member 74 having reinforced ribbing 76 extending along its interior, and a slot 78 adjacent the bottom thereof for receiving a metal insert core or bar 80 which may be a solid steel core or a hollow core. While a rectangular-shaped core is shown, it is conceivable that a circular or tubular core could be used as well. The plastic sheath 74 is seen to have journal support members 82 integral therewith at each end thereof, similar to the support members 42 for the shutoff bar shown in FIG. 9. In this embodiment, the metal insert or core 80 is simply inserted into the slot 78, either at the factory during assembly or by the purchaser after sale.

The foregoing relates to preferred embodiments of the present invention, it being understood that other embodiments and variants thereof are possible within the scope of the invention, the latter being defined by the appended claims.

What is claimed and desired to be secured by Letters Patent of the United States is:

1. A drop spreader comprising, a frame having spaced-apart leg members, a hopper connected to said leg members of said frame and having a materials-dispensing aperture means disposed at the bottom thereof, wheel means supporting said hopper, a shutoff bar disposed externally of said hopper adjacent said aperture means, said shutoff bar having journal support means for rotatably supporting said shutoff bar to move across said aperture means for opening and shutting said aperture means, and said shutoff bar being composed of two different materials in which one of said materials forms a high-strength tubular metal core and the other of said materials forms a sheath member of light-weight plastic material surrounding said high-strength core.

2. A drop spreader according to claim 1, wherein said high strength core is a hollow tubular member.

3. A drop spreader according to claim 1 wherein said sheath member is integral with said journal support means, said journal support means being disposed at respective ends of said plastic sheath member.

4. A drop spreader according to claim 1, wherein said sheath member is substantially hollow, having ribbed reinforcing means extending along the interior thereof, and further including means defining a longitudinally extending slot in the interior thereof, whereby said high-strength metal core is slidably received within said slot.

5. A drop spreader according to claim 4, wherein said high strength metal core is a solid bar.

6. A drop spreader according to claim 1, wherein said sheath member of said shutoff bar has a longitudinal face portion that is curved and complements the curve at the bottom of said hopper in the vicinity of said aperture means.

7. A drop spreader according to claim 6, wherein said curved face portion comprise a longitudinally extending rib member acting as a wiper blade across the curved bottom of said hopper.

8. A drop spreader comprising, a frame having spaced-apart leg members, a hopper connected to said leg members of said frame and having a materials-dispensing aperture means disposed at the bottom thereof, wheel means supporting said hopper, a shutoff bar disposed externally of said hopper adjacent said aperture means, said shutoff bar having journal support means for rotatably supporting said shutoff bar to move across said aperture means for opening and shutting said aperture means, and said shutoff bar having a longitudinal curved face portion complementing the curve at the bottom of said hopper in the vicinity of said aperture means, and said curved face portion having a longitudinally extending rib member acting as a wiper blade across the curved bottom of said hopper.

9. A spreader comprising, a frame having spaced-apart leg members, a hopper connected to said leg members of said frame and having a materials-dispensing aperture means disposed at the bottom thereof, wheel means supporting said hopper, shutoff means disposed externally of said hopper adjacent said aperture means, a control lever on said frame, a micrometer device having one end thereof connected to one end of a flexible cable whose other end is connected to said shutoff means, and said control lever having a snap-on connection means for pivotally connecting said control lever to the other end of said micrometer device, said snap-on connection means being the sole support for said micrometer device.

10. A spreader according to claim 9, wherein said snap-on connection means comprises a pair of spaced-apart pliable ear members having protruding nodule members thereon facing each other, said nodules having beveled surfaces for cooperating with complementary surfaces on a post member extending from said micrometer device, said post member having opposing apertures thereon, whereby said nodules respectively engage said apertures when said post member is inserted between said pliable members to thereby force said nodules apart.

11. A spreader according to claim 9, wherein said other end of said flexible cable connected to said shutoff means comprises a snap-on connection.

* * * * *